Dec. 12, 1933.  W. A. MINKLER  1,939,609
RELAY PROTECTIVE SYSTEM
Filed May 23, 1931  2 Sheets-Sheet 1

WITNESSES:
Arthur J. McMahon
M Davidson

INVENTOR
William A. Minkler
BY
Wesley G. Carr
ATTORNEY

Dec. 12, 1933.   W. A. MINKLER   1,939,609
RELAY PROTECTIVE SYSTEM
Filed May 23, 1931   2 Sheets-Sheet 2

WITNESSES:
Arthur J. McMahon
TH Davidson

INVENTOR
William A. Minkler
BY
Wesley H. Carr
ATTORNEY

Patented Dec. 12, 1933

1,939,609

UNITED STATES PATENT OFFICE 1,939,609

RELAY PROTECTIVE SYSTEM

William A. Minkler, Wilkinsburg, Pa., assignor to Westinghouse Electric & Manufacturing Company, a corporation of Pennsylvania Application May 23, 1931. Serial No. 539,559

12 Claims. (Cl. 175—294)

The present invention is directed to a sensitive and accurate time-delay means employing an electronic tube and suitable means for effecting the actuation thereof in accordance with any predetermined electrical or mechanical conditions existing upon electrical systems and apparatus.

For proper system protection, it is highly desirable to isolate any section upon the occurrence of abnormal conditions which endanger the system stability or adversely affect any load or apparatus operation.

Many of the present-day systems are provided with high-speed protective apparatus operable, in the event of short-circuit conditions, to isolate such faulty section without impairing the stability of the system. Such protective equipment is essential in important interconnected alternating-current networks, and the present invention is to be used in such systems as an ancillary protective means. In other systems, the necessity for high-speed protection does not exist, and the protective device of the present invention may be utilized to protect against any and all abnormal system conditions.

Most load apparatus is designed to withstand abnormal electrical conditions only for a limited time, and some form of definite-time-delay means is required for effecting the disconnection or isolation of such apparatus before the apparatus or system is damaged.

In all of the prior art protective systems, the load apparatus has not received proper protection in the event of recurrent-transient conditions. The only protection afforded occurred as the result of a sustained abnormal condition. The present invention provides protection for electrical systems and apparatus for both sustained and recurrent abnormal electrical or mechanical conditions.

It is an object of the present invention, therefore, to provide a combination integrating and definite-time-delay protective apparatus.

Another object of the present invention is to provide complete protection for an electrical system or apparatus under any predetermined abnormal electrical or mechanical conditions.

Another object of the present invention is to provide a simplified protective apparatus utilizing a minimum of mechanically-actuated electro-responsive devices.

Another object of the present invention is to provide an electronic means effectively energized only after a predetermined definite time-delay, in the event of predetermined abnormal electrical conditions or upon the recurrence of predetermined abnormal transient conditions.

Further objects and advantages of the present invention will readily become apparent to one skilled in the art from a description of the operation of several applications of the proposed protective scheme.

Several applications of protective schemes operating in accordance with the principles and teachings of the present invention are shown in the schematic wiring diagrams of the accompanying drawings. The present invention may be applied to the protection of any electrical system or apparatus in the event of any predetermined abnormal electrical or mechanical conditions, and the applications shown in the drawings are to be construed as being generic in character.

Figure 1:
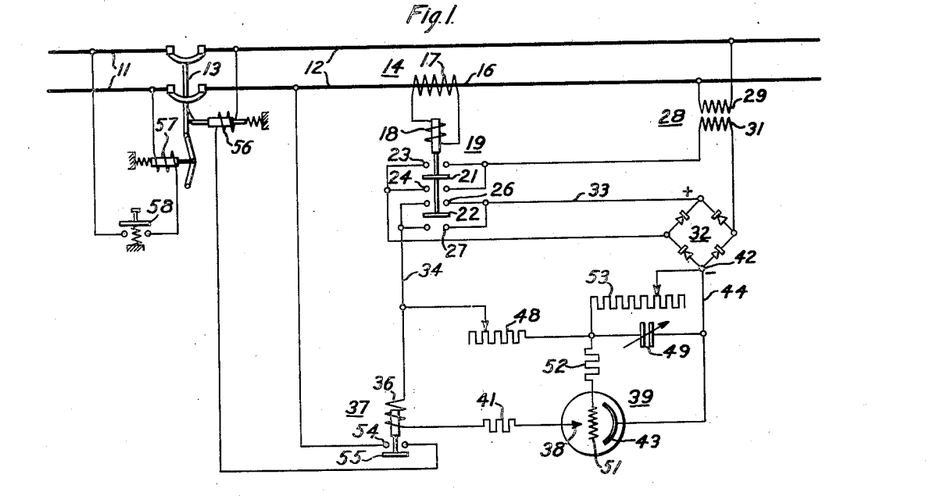
Figure 1 illustrates one embodiment of the invention responsive to predetermined abnormal conditions of current in an electrical system.

Referring more particularly to Fig. 1, a supply circuit 11 is adapted to be connected to a load circuit 12 through a circuit-interrupter 13. The circuits 11 and 12 may be considered as adjacent sections of a sectionalized transmission system, and the circuit-interrupter 13 as being disposed in a substation, if desired. However, the operation of the present invention is the same, irrespective of the intended application. The circuits 11 and 12 are indicated as single phase but it is to be understood that any polyphase system may be protected, and the necessary changes in the means for indicating the predetermined abnormal electrical conditions should be apparent to one skilled in the art.

Assuming the circuit 12 to be supplying energy to load apparatus and that a sustained abnormal-current condition will be injurious to such apparatus, a current transformer 14 is provided, the primary winding 16 thereof being indicated as one conductor of circuit 12 and the secondary winding 17 being connected in series with the energizing winding 18 of a current-responsive relay 19.

The relay 19 is provided with contact segments 21 and 22 and stationary contacts 23, 24, 26 and 27. Under normal energized conditions of circuit 12, the energizing winding 18 is energized to maintain the segments 21 and 22 out of engagement with the stationary contacts 23, 24 and 26, 27, respectively, as shown. Upon the occurrence of an overcurrent of predetermined magnitude, the winding 18 is effectively energized to effect the bridging of stationary contacts 23 and 26 by the segments 21 and 22, respectively, and, upon the occurrence of an undercurrent of predetermined magnitude, the contact segments 21 and 22 bridge the stationary contacts 24 and 27, respectively. The stationary contacts 23 and 24 are connected in parallel, and the stationary contacts 26 and 27 are connected in parallel, with the result that, for any predetermined abnormal-current condition, the contact segment 21 completes only one circuit, and contact segment 22 completes only a second circuit.

A potential transformer 28 has the primary winding 29 thereof connected to the load circuit 12, and the terminals of the secondary winding 31 connected to a suitable rectifying means 32; the circuit from one of the transformer secondary terminals being completed to one terminal of the rectifying means 32 through one of the relay contacts 23 and 24 and contact segment 21. With such an arrangement of connections, the rectifying means 32 is only energized when the relay 19 is actuated in response to predetermined abnormal-current conditions in the load circuit 12.

The rectifying means 32 is shown schematically as a full-wave-copper-oxide rectifier but it is obvious that a rectifying means of any suitable type may be utilized to provide either half or full-wave rectification. One such alternative means is a tube rectifier of any well-known construction.

The positive direct-current terminal of the rectifier 32 is electrically connected to one of the contacts 26 and one of the contacts 27 of relay 19, by conductor 33. The electrical circuit including conductor 33 is only completed when the relay 19 is actuated, upon the occurrence of abnormal-current conditions, to bridge either contacts 26 or contacts 27 by the contact segment 22. A conductor 34 is connected to the other parallel-connected contacts 26 and 27 and to one terminal of energizing winding 36 of relay 37. The other terminal of the energizing winding 36 is connected to the anode-electrode 38 of an electronic-discharge device 39, through resistor 41.

The negative direct-current terminal 42 of the rectifying means 32 is connected to the cathode-electrode 43 of the electronic-discharge device 39 by means of conductor 44, and the direct-current voltage obtained from the rectifying means 32 is impressed across the principal electrodes 38 and 43 of the device 39 only when the relay 19 has been actuated, in accordance with a predetermined abnormal-current condition in circuit 12, to bridge either the contacts 26 or the contacts 27.

One terminal of a relatively high variable-resistance resistor 48 is connected to conductor 34, and the other terminal is connected to the conductor 44 through a series variable capacitor 49. When either the contacts 26 or the contacts 27 of relay 19 are bridged, the direct-current voltage of the rectifying means 32 is impressed across this series circuit, and the capacitor 49 is charged in accordance with such voltage, the rate and magnitude of the charge being determined by the respective values of the resistor 48, the capacitor 49 and the magnitude of the rectified voltage.

The electronic-discharge device 39 may be considered as a cold-cathode glow-discharge tube having a third or grid element 51. The theory of operation of such tubes being well known in the art, it is not necessary to detail such theory in the present application. Briefly, a direct-current voltage is impressed across the anode 38 and the cathode 43, and a voltage is impressed across the grid 51 and the cathode 43.

When the grid voltage is of a predetermined magnitude, it is sufficient to complete the ionization of the gas in the tube 39, and a resultant glow-discharge is effected between the anode 38 and the cathode 43. The value of the resistor 41 is so chosen that the resistance of the main-electrode circuit, including the winding 36 of the relay 37, is of such value as to permit only a glow-discharge between the anode 38 and the cathode 43, thereby permitting an effective value of current to flow in the circuit without injury to the tube elements.

The grid element 51 is energized in accordance with the charge on the capacitor 49, the grid circuit being completed from the grid 51 through a relatively high-resistance resistor 52 and the capacitor 49 and thence to the cathode-electrode 43. The resistor 52 is provided to prevent the grid receiving too much current and, for higher resistance values of such resistor, the necessary effective grid voltage must be of greater magnitude.

The variable capacitor 49 is shunted by a very large variable-resistance resistor 53, one limiting value of which may be infinity. This resistor permits the charge on the capacitor 49 to dissipate after a predetermined time. The function of the variable resistor 53 will be described in detail hereinafter.

The relay 37 is provided with stationary contacts 54 which are adapted to be bridged by contact segment 55 upon the break-down or discharge of the tube 39. The relay 37 is so designed that, upon the break-down of the tube 39, the energizing winding 36 is effectively energized by such discharge current to actuate the contact segment, thereby completing a trip circuit for the circuit interrupter 13 from one conductor of the circuit 12, through the interrupter-tripping winding 56, contacts 54 and contact segment 55 of relay 37, and thence to the other conductor of circuit 12.

Any suitable circuit-interrupter-closing means may be utilized, such as that shown in the drawings where the closing winding 57 is energized from one conductor of the supply circuit 11, through the winding 57, normally open push-button switch 58 and thence to the other conductor of circuit 11.

Assuming the circuit-interrupter 13 to be in closed position and normal current conditions to exist upon the supply and load circuits 11 and 12, the energizing winding 18 of relay 19 is effectively energized to maintain the contact segments 21 and 22 out of engagement with the stationary contacts 23 and 24 and 26 and 27, respectively.

Next, assuming an overcurrent condition to exist on circuit 12 and that the magnitude of such current is injurious to load apparatus connected to the circuit 12 if such abnormal current condition persists a predetermined length of time, in order to protect the load apparatus, the relay 18 is designed and adjusted to close contacts 23 and 26 upon the occurrence of dangerous current condition, with the result that the energizing circuit for the rectifying means 32 is completed from one secondary terminal of the voltage transformer 28, through contacts 23 and contact segment 21 of relay 19, one terminal of the rectifying means 32 and from a second terminal of the rectifying means 32 to the remaining secondary terminal of the voltage transformer 28.

The actuation of the relay 19 also effects the bridging of contacts 26 by the contact segment 22, thereby completing the direct-current output circuit of the rectifying means 32 and impressing the direct-current voltage across the anode and cathode electrodes 38 and 43 of the electronic-discharge device 39.

The magnitude of the voltage impressed across the anode 38 and cathode 43 is alone insufficient to complete the ionization of the gas in the tube device 39 and effect a glow-discharge between these principal electrodes to thereby cause an effective energizing current to traverse the energizing winding 36 of relay 37. It is necessary, therefore, to impress a voltage across the grid 51 and the cathode 43, in addition to the voltage impressed across the anode 38 and the cathode 43, before the gas in the tube device 39 is completely ionized and a resultant glow-discharge is effected between the anode 38 and the cathode 43.

This additional voltage is obtained by means of the charge stored in the variable capacitor 49. As pointed out hereinbefore, the variable capacitor 49 is connected in series with the variable-resistance resistor 48 and this series circuit is connected across the direct-current terminals of the rectifying means 32, with the result that the capacitor 49 is charged at a rate depending upon the respective values of the resistor 48, the capacitor 49 and the magnitude of the direct-current voltage derived from the rectifying means 32. The magnitude of such charge depends upon the size of the capacitor 49 and the magnitude of the direct-current energizing voltage.

Taking into consideration the permissible time for the overcurrent condition to persist upon circuit 12 before the connected load apparatus is damaged, the respective values of the resistor 48 and the capacitor 49 are so chosen that the capacitor 49 receives an effective charge sufficient to impress the necessary voltage across the grid 51 and cathode 43 to effect the glow-discharge between the anode 38 and the cathode 43, only after a time delay corresponding to the permissible time for such sustained abnormal-current condition. As is well known in the art, the characteristics of the tube device 39 may be so chosen that different magnitudes of grid-to-cathode voltage must be supplied before the tube device breaks down and it is further obvious that such effective value of voltage may be varied by changing the value of the resistor 52 in the grid circuit. It follows, therefore, that any desired time delay may be obtained, after the actuation of relay 19, before the tube device 39 breaks down and a current flows in the main-electrode circuit.

Upon the occurrence of the glow-discharge between the anode 38 and cathode 43 of the tube device 39, an energizing current flows through the energizing winding 36 of relay 37, and the value of such current is limited by the combined resistance of the winding 36 and the resistor 41 so that only a glow-discharge is maintained between the anode 38 and cathode 43, with the result that the elements and the life of the tube device 39 are not adversely affected.

The energization of winding 36 effects the actuation of relay 37, and the contacts 54 are bridged by the contact segment 55 to thereby complete a tripping circuit for the circuit-interrupter 13. This tripping circuit may be traced from one conductor of circuit 12, contacts 54 and contact segment 55 of relay 37, tripping winding 56 and thence to the other conductor of circuit 12. The circuit-interrupter 13 is thereby opened, and the load apparatus disconnected from the supply circuit 11, after a predetermined permissible time delay upon the occurrence of a sustained overcurrent of a predetermined minimum magnitude.

The opening of the circuit-interrupter 13 isolates the circuit 12 and effects the deenergization of the relay 19 and the rectifying means 32. As a result, the energizing circuit for the tube device 39 is interrupted, and the relay 37 is deenergized to effect the opening of contacts 54 and to thereby open the trip circuit for the circuit interrupter 13. The protective apparatus of the present invention is, therefore, returned to its original condition, assuming the current-responsive relay 19 to be of any well-known design so that the contact segments 21 and 22 are maintained out of engagement with the stationary contacts 24 and 27, respectively, when the energizing winding 18 is deenergized and also when normal-electrical conditions exist on the circuit 12.

The operation of the present invention is substantially the same for sustained-undercurrent conditions existing on the circuit 12 for a predetermined time, and the relay 19 may be so designed to effect the bridging of contacts 24 and 27 by the contact segments 21 and 22, respectively, when such abnormal-current condition exists. Since the same electrical circuits are completed to the time-delay apparatus of the present invention, irrespective of whether contacts 23 and 26 or 24 and 27 are bridged by the contact segments 21 and 22, respectively, it is not necessary to detail the operation of the present invention under such sustained undercurrent conditions. It is obvious that the circuit interrupter 13 may be actuated to its open position after a predetermined-time delay upon the occurrence of a sustained undercurrent of predetermined magnitude.

The relay 19 is indicated as a combination-over-current-and-undercurrent relay and it is obvious that the time-delay apparatus may be associated with only an over-current relay or an undercurrent relay, as the occasion warrants.

The operation of the present invention has been considered only with reference to sustained abnormal conditions. The necessity for protection, under such conditions, is obvious, and many time-delay schemes have been devised for affording such protection. The present invention provides a definite time-delay means, as described, and, in addition, permits of protection against recurrent-transient conditions. Many types of load apparatus are adversely affected by recurrent transient electrical conditions in the energizing circuit therefor, and it is desirable to effect the isolation of such apparatus in the event of such conditions. The possibility that recurrent transient conditions are indicative of electrical or mechanical faults, which should be rectified before the consequences thereof prove disastrous, makes the provision of some indicating means extremely advisable, with the result that such improper condition may be corrected without disconnecting any load apparatus or circuits. Obviously, such indicating means may comprise some signal, such as a bell or light, or a circuit or load apparatus may be isolated from such faulty-supply system, the means of protection depending upon the type of system or apparatus to be protected.

Bearing in mind the function of the present invention upon the occurrence of sustained-abnormal conditions, the operation under recurrent-transient conditions may be easily understood.

Referring to Fig. 1 and assuming a short-overcurrent condition to exist, the duration of which is insufficient to cause the glow-discharge of the tube device 39, the relay 19 is actuated to bridge contacts 23 and 26 by means of contact segments 21 and 22, respectively, and the series circuit comprising the variable resistor 48 and the variable capacitor 49 is energized in accordance with the direct-current voltage derived from the rectifying means 32. Since the transient-overcurrent condition in circuit 12 is not of long enough duration to permit the charging of the capacitor to a predetermined effective value, the relay 19 effects the opening of contacts 23 and 26 and the tube device 39 is not energized to effect the actuation of relay 37 and the consequent tripping of the circuit interrupter 13.

However, since it is assumed that the transient-overcurrent conditions on circuit 12 are recurrent in character, the relay 19 will again be actuated upon the recurrence of such transient or other overcurrent condition with the result that the capacitor receives an additional charge, the value thereof depending upon the duration of such transient condition. From the foregoing, it is clear that the capacitor 49 will be effectively charged to effect the glow-discharge of the tube device 39 when the recurrent-transient condition has been of such frequency and/or duration to charge the capacitor 49 sufficiently to produce the necessary voltage across the grid 51 and cathode 43 of the tube device 39.

The above-described feature of the present invention may be referred to as providing an integrating feature, since the recurrence of predetermined transient conditions effects a cumulative charge on the capacitor 49. This feature of the invention, as described thus far, would seem to destroy the accuracy of the definite-time-delay feature which is necessary for the proper protection of some apparatus and systems. This apparent disadvantage would occur when the capacitor 49 has received a charge as a result of one transient condition and, a substantial period of time later, a second transient condition might occur and such second transient be insufficient in itself to effect the breakdown of the tube device 39. Such condition might effect the improper opening of the circuit interrupter 13, in view of the combined effect of the two transients in producing the predetermined effective charge on the capacitor 49, and, obviously, such improper action should not be permitted.

To obviate this apparent disadvantage the high variable-resistance resistor 53 is provided and is permanently shunted across the capacitor 49. This variable resistor provides a shunt path or means for the charge on the capacitor to dissipate, the rate of such dissipation or discharge being determined by the value of the resistance 53 and the value of the charge on the capacitor 49. Obviously the resistor 53 may be so varied as to permit only a short time-delay in the dissipation of the charge on the capacitor 49, or the value of such resistor may be made infinite, or no shunt path, and thereby permit of no, or very slow, dissipation of the charge on the capacitor.

The contacts 26 and 27 in the direct-current output circuit of the rectifying means 32 are normally open, although such contacts may be omitted and a permanent electrical connection provided between conductors 33 and 34. Such a permanent connection would provide a second shunt circuit for permitting the charge on the capacitor 49 to dissipate, the path thereof being through the copper-oxide-rectifying means 32. The resistance offered by such rectifying means to the flow of reverse current may easily be determined and this constant resistance path, if not too small, would be permissible, in addition to the variable resistor 53. Should a tube rectifying means be provided instead of a copper-oxide-rectifying means, as shown, the contacts 26 and 27 could be dispensed with and the conductors 33 and 34 directly connected, since the reverse-current resistance of such tube is extremely high.

Figure 2:
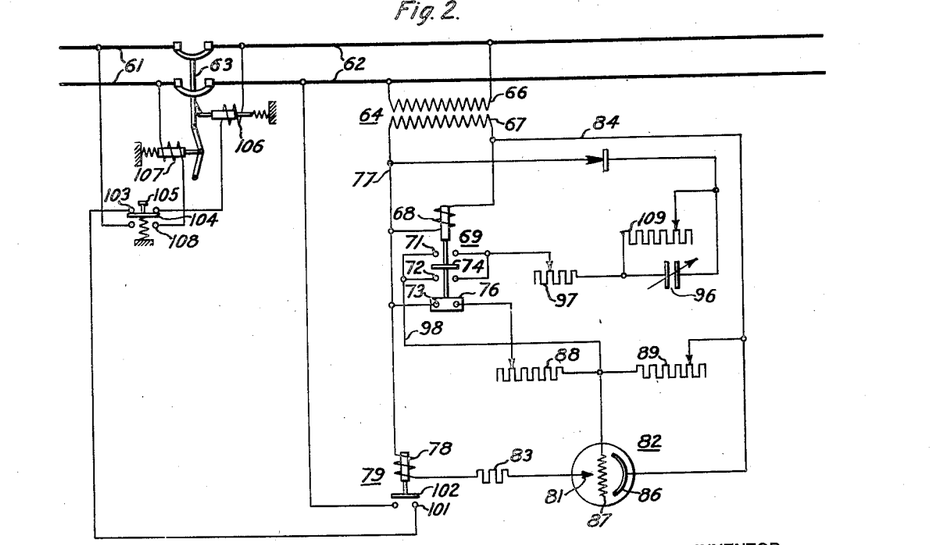
Fig. 2 is a schematic diagram of another form of the invention responsive to predetermined abnormal voltage conditions in an electrical system.

Fig. 2 illustrates another form of the present invention as applied to an alternating-current system, and the protective scheme disclosed therein is adapted to be effectively energized to open a suitable circuit interrupter upon the occurrence of either a sustained abnormal-voltage condition or upon the recurrence of transient abnormal-voltage conditions.

In this modification, a supply circuit 61 is adapted to energize a load circuit 62 through a suitable circuit interrupter 63. A voltage transformer 64 has the primary winding 66 thereof associated with the conductors of the load circuit 62, and the transformer-secondary winding 67 is serially connected with the energizing winding 68 of a voltage-responsive relay 69. Since the application of the present invention, as shown in this modification, is intended to represent a combination integrating and definite-time-delay relay means responsive to abnormal-voltage conditions in the load circuit 62, the voltage relay 69 is indicated as being responsive to both an overvoltage and an undervoltage of predetermined magnitude.

The voltage-responsive relay 69 is provided with stationary contacts 71, 72 and 73 and moving contact segments 74 and 76. The stationary contacts 71 and 72 are connected in parallel so that, upon the actuation of the contact segment 74, only one circuit is completed in the event either the contacts 71 or 72 are bridged.

Under normal-energized conditions on the load circuit 62 and for normal-voltage conditions existing thereon, the energizing winding 68 of the relay 69 is effectively energized to maintain the contact segment 74 out of engagement with both the contacts 71, 72, while the contacts 73 are normally bridged by the contact segment 76. The voltage-responsive relay 69 may be so designed and adjusted as to be effectively energized to bridge the contacts 71 by means of contact segment 74 upon the occurrence of an over-voltage of predetermined magnitude on the load circuit 62. When the relay 69 is thus effectively energized, the contacts 73 are opened and the contacts 72 remain open.

In a similar manner, the contacts 72 are closed by the contact segment 74 upon the occurrence of an undervoltage of predetermined magnitude on the load circuit 62. At the same time, the contacts 73 are opened by the disengagement of the contact segment 76. From the foregoing, it may be noticed that the contacts 71, 72 are normally open while the contacts 73 are normally bridged by the contact segment 76. However, upon the actuation of the voltage-responsive relay 69, the contacts 71 or 72 are bridged by the contact segment 74 depending upon the nature of the voltage abnormality, and for such actuation of the relay 69, the contact segment 76 is moved out of engagement with the contacts 73.

One terminal conductor 77 of the secondary winding 67 of the voltage transformer 64, is connected to one terminal of the energizing winding 78 of a relay 79, and the remaining terminal of the energizing winding 78 is connected to the anode-electrode 81 of the electronic-discharge device 82 through a serially-connected resistor 83. A second conductor 84 is connected to the remaining secondary terminal of the voltage transformer 64 and thence to the cathode-electrode 86 of the electronic-discharge device 82. In accordance with these connections, it is clear that the secondary voltage, of the voltage transformer 64, is normally impressed across the anode 81 and the cathode 86 of the electronic-discharge device 82.

The tube device 82 is provided with a third or grid element 87 and, as referred to hereinbefore, it is necessary to provide a voltage across the grid element 87 and the cathode-electrode 86, in addition to the voltage impressed across the anode 81 and the cathode 86, in order to effect the actuation or discharge of the tube device 82.

One of the contacts 73 of the voltage-responsive relay 69 is connected to the conductor 77 and the remaining contact 73 is connected to one terminal of a variable resistor 88, the value of which resistor will be referred to hereafter. The remaining terminal of the resistor 88 is connected to the second conductor 84 through a second variable resistor 89, and the grid element 87 is connected to the common connection between the resistors 88 and 89.

In accordance with the above-described connections, a circuit is normally completed from the secondary terminal conductor 77 of the voltage transformer 64, through contacts 73 and contact segment 76 of the voltage-responsive relay 69, variable resistor 88, variable resistor 89 and thence to the remaining secondary terminal of the voltage transformer 64, through the conductor 84, The variable resistors 88 and 89 are normally adjusted to provide approximately equal resistances to the flow of current and, under normal conditions of energization of the load circuit 62, a current flows through such resistors and effects a voltage drop across the resistor 89 which is of sufficient magnitude to effect a proper voltage across the grid element 87 and the cathode 86 of the tube device 82 to thereby effect a normal glow-discharge between the anode 81 and the cathode 86 of the tube device 82.

A suitable rectifier 91 is connected between the terminal conductor 77 of the transformer secondary 67 and one terminal of a variable capacitor 96. The remaining terminal of the capacitor 96 is connected to one of the contacts 71 and also to one of the contacts 72, of relay 69, through a variable resistor 97. A conductor 98 is connected to the remaining parallel connected contacts 71 and 72 and also to the common connection point of the variable resistors 88 and 89, thereby completing an electrical circuit from the transformer secondary 67 through the rectifier 91, variable capacitor 96, variable resistor 97, contacts 71 or 72 and contact segment 74 of relay 69, conductor 98, variable resistor 89, conductor 84, and thence to one secondary terminal of the transformer 64, when the voltage-responsive relay 69 has been actuated in response to a predetermined-abnormal-voltage condition existing on the load circuit 62.

The relay 79, included in the main-electrode circuit of the tube device 82, is provided with stationary contacts 101 and contact segment 102. The contacts 101 are normally open and a trip circuit for the circuit interrupter 63 is only effected upon the bridging of contacts 101 by the contact segment 102 of relay 79. This trip circuit may be traced from one conductor of the load circuit 62, through the contacts 101 and contact segment 102 of the relay 79, normally closed contacts 103 and contact segment 104 of a push-button switch 105, tripping winding 106 and thence to the other conductor of the load circuit 62.

Any suitable circuit-interrupter-reclosing means may be provided and is indicated in the drawings as a reclosing winding 107 which is adapted to be energized from one conductor of the supply circuit 61, through the reclosing winding 107, normally open contacts 108 of the push-button switch 105, and thence to the other conductor of the supply circuit 61.

Assuming that an abnormal voltage condition exists on the load circuit 62 and that such abnormal voltage condition is injurious to any connected load apparatus or to the system itself, the voltage-responsive relay 69 is so designed and adjusted to be actuated in accordance with such predetermined-abnormal-voltage condition. First, assuming an abnormal overvoltage condition to exist, the relay 69 is effectively energized to bridge the stationary contacts 71 by means of the contact segment 74 and, at the same time, to move the contact segment 76 out of engagement with the normally-closed contacts 73.

In accordance with the normal energizing connections for the electronic-discharge device 82, a continuous glow-discharge is effected between the anode-electrode 81 and the cathode-electrode 86 of the tube device 82. The energizing winding 78 of relay 79 is, therefore, normally energized in accordance with such glow-discharge current so as to maintain the contact segment 102 out of engagement with the stationary contacts 101, As noted hereinbefore, the necessary grid-to-cathode voltage for the tube device 82 is produced in accordance with the voltage drop across the variable resistor 89, and such voltage drop resulted from the current flowing through the normally-closed circuit from conductor 77 through contacts 73 and contact segment 76 of the relay 69, variable resistor 88, variable resistor 89, conductor 84 and thence to the remaining secondary terminal of the voltage transformer 64.

However, upon the actuation of the voltage-responsive relay 69 to effect the bridging of contacts 71 by the contact segment 74, the normal energizing circuit for the variable resistors 88 and 89 is opened by the actuation of contact segment 76, and a second energizing circuit for the variable resistor 89 is completed from the rectifier 91, through the variable capacitor 96, variable resistor 97, contacts 71 and contact segment 74 of relay 69, conductor 98, variable resistor 89, conductor 84 and thence to the secondary terminal 84 of the voltage transformer 64. A charging current is thereby produced for building up a charge on the variable capacitor 96 and such current is made to flow through the variable resistor 89. In this manner, a voltage drop is maintained across the variable resistor 89 and the necessary grid-to-cathode voltage is maintained on the tube device 82 to ensure an uninterrupted glow-discharge between the anode-electrode 81 and the cathode-electrode 86 of the tube device 82. As long as the capacitor 96 is being charged.

The rate of charge of the variable capacitor 96 is determined by the value of such capacitor, the value of the variable resistor 97 and the magnitude of the direct-current voltage provided by the tube rectifier 91, while the magnitude of such charge is determined by the size of the capacitor 96 and the magnitude of the rectified voltage provided by the tube rectifier 91.

In accordance with the energizing circuit completed through the variable capacitor 96 when the contacts 71 of the relay 69 are bridged by the contact segment 74, a current flows through such variable capacitor 96 and the connected variable resistor 89 only for a time sufficient to fully charge the variable capacitor 96. When such charge has been completed, a current ceases to flow in this circuit and there is no resultant voltage drop across the variable resistor 89. The failure of the voltage drop across the variable resistor 89 results in the deenergization of the tube device 82, since the voltage impressed across the anode-electrode 81 and the cathode-electrode 86 is insufficient in itself to reignite the glow-discharge in the tube device 82 after each current-zero of the alternating-current supply.

As a result of the deenergization of the tube device 82, the energizing winding 78 of the relay 79 is deenergized and the contact segment 102 bridges the stationary contacts 101 and completes the energizing circuit for the tripping winding 106 of the circuit interrupter 63. As referred to hereinbefore, this tripping circuit may be traced from one conductor of the load circuit 62 through the contacts 101 and contact segment 102 of relay 79, normally-closed contacts 103 and contact segment 104 of the push-button switch 105, tripping winding 106 and thence to the other conductor of the load circuit 62. The circuit interrupter 63 is thereby actuated to its open position and the load circuit 62 and any associated load apparatus connected thereto is isolated from the supply circuit 61.

The reclosure of the circuit interrupter 63 is effected by depressing the normally-biased-push-button switch 105 so that the contact segment 104 bridges the contacts 108 and effects an energizing circuit for the reclosing winding 107. At the same time, the contacts 103 in the trip circuit of the circuit interrupter 63 are opened if the abnormal voltage condition no longer exists on the line 62, the relay 69 immediately moves to its normal, intermediate position, as shown in the drawings, and the winding 78 of the relay 79 is effectively energized in accordance with the voltage obtained from the load circuit 62 so as to move the contact segment 102 out of engagement with the contacts 101 and thereby maintain the tripping circuit of the circuit interrupter 63 in normal open condition. Any suitable time delay means in effecting the bridging of the contacts 103 by the contact segment 104 of the push-button switch 105 may be provided, such time delay being proper to permit of the effective energization of the winding 78 of relay 79 before the contacts 103 are bridged by the contact segment 104. Such time delay may be obtained by merely maintaining the push button switch 105 in its depressed position for such predetermined necessary time. However, since the breakdown of the tube device 82 is substantially instantaneous upon the energization of the voltage transformer 64, the energizing winding 78 of relay 79 will ordinarily be effectively energized, and will move its contact segment 102 out of engagement with the contacts 101 before the push-button switch 105 would ordinarily be returned to its normal position.

The resistor 83 is included in the main electrode circuit of the tube device 82 and the combined value of the resistance of energizing winding 78 of relay 79 and the resistance of the resistor 83 is so chosen to ensure that only a glow-discharge is maintained between the anode-electrode 81 and the cathode-electrode 86 of the tube device 82. The provision of this resistor is quite advantageous in view of the protection afforded to the tube device 82 and, inasmuch as the tube device 82 is normally broken-down, a proper current-limiting resistor is necessary in order to lengthen the life of the electronic-discharge device.

The operation of this modification of the present invention has been considered only for a sustained-abnormal-voltage condition on the load circuit 62 and it is clear from the foregoing description, with reference to this Fig. 2 modification, that any suitable time delay may be obtained in effecting the opening of the circuit interrupter 63, such time depending upon the respective values of the rectified current provided by the rectifier 91, the value of the variable capacitor 96, the value of the variable resistor 97 and the value of the variable resistor 89. It is obvious that the desired time delay may also be varied by altering the characteristics of the electronic-discharge tube 82 and such variation in the tube characteristics would probably be effected in the necessary grid-to-cathode voltage requirement.

Since the contacts 71, 72 of the voltage-responsive relay 69 are connected in parallel and only one electrical circuit is completed upon the actuation of such relay to effect the movement of contact segment 74, the operation of the present invention is substantially the same for sustained-abnormal-undervoltage conditions existing on the load circuit 62. Reference to the operation of the present invention under such abnormal voltage conditions is not deemed necessary in view of the repetitive nature of such explanation.

This modification of the present invention also affords proper protection for the load circuit 62 and any connected load apparatus in the event of recurrent-transient-abnormal-voltage conditions existing on the load circuit 62. The operation of the invention under such conditions is substantially similar to the operation of the embodiment of the invention described in Fig. 1 and may be referred to briefly as follows.

Assuming a transient-overvoltage condition to exist on the load circuit 62, the voltage-responsive relay 69 is actuated to effect the bridging of contacts 71 by contact segment 74, and the variable capacitor 96 receives a charge, the magnitude thereof being determined by the predetermined constants of the circuit including the rectifier 91, capacitor 96, resistor 97, resistor 89, and the characteristics of the tube device 82. Upon the disappearance of such transient condition, the voltage-responsive relay 69 is actuated to its normal position and the time delay apparatus is substantially the same as before with the exception that the capacitor 96 is charged to a value depending upon the time which such transient condition persisted. Should a second or other consecutive transient-abnormal-voltage condition occur on the load circuit 62, the voltage-responsive relay 69 is again actuated to close either contacts 71 or 72 by means of the contact segment 74, and the capacitor 96 receives an additional charge, the value of such additional charge depending upon the duration of such transient condition.

From this arrangement, it is clear that, upon the recurrence of transient-abnormal-voltage conditions either of predetermined frequency or duration, the capacitor 96 becomes fully charged and, upon the actuation of the voltage-responsive relay 69 to close either the contacts 71 or 72 by the contact segment 74, a current is not permitted to flow through the rectifier 91, and the circuit, including the capacitor 96, resistor 97, resistor 89, and conductor 84. When such condition exists, the glow-discharge of the tube device 82 is interrupted and the energizing winding 78 of relay 79 is deenergized so as to effect the bridging of contacts 101 by the contact segment 102 to thereby complete the trip circuit for the tripping coil 106 of the circuit interrupter 63.

A very large variable resistor 109 is shunted across the variable capacitor 96 and serves as a means for permitting the charge on the capacitor 96 to dissipate itself, the rate of such discharge of the capacitor being determined by the value of such resistor. Obviously, the value of the resistor 109 may be so chosen as to permit the charge on the capacitor 96 to be dissipated after a predetermined time and such provision permits the time delay apparatus of the present invention to incorporate a reset feature, such that the circuit interrupter 63 is actuated to its open position only when a sustained abnormal-voltage condition exists on the load circuit 62 or when recurrent transient abnormal-voltage conditions occur on the load circuit 62.

It is clear that the definite time delay of operation of the proposed apparatus for sustained abnormal-voltage conditions will not be altered in the event that a single transient abnormal-voltage condition occurs, and then a substantial time thereafter a sustained abnormal voltage condition occurs on the load circuit 62. In such case, the charge on the capacitor 96, due to the transient, will be dissipated through the shunting resistor 109 and, upon the occurrence of such sustained abnormal-voltage condition, the charge upon the capacitor 96 is initially of zero value and the time required for the effective charging of the capacitor 96 will provide the predetermined definite time delay of operation of the protective system disclosed in this modification.

In the two modifications of the present invention as disclosed in Figs. 1 and 2, it will be noticed that the energizing means for the electronic-discharge device is dependent upon the voltage existing upon the load circuit to which the protective apparatus is connected. In accordance with such system connections, the degree of energization of the electronic-discharge device is caused to vary directly as the load-circuit voltage and in the modification disclosed in Fig. 2, it is obvious that the definite time-delay feature cannot be adjusted with any degree of accuracy except for a predetermined maximum magnitude or minimum value of a predetermined abnormal-voltage condition. This condition may be desirable in many instances where it is desired to effect an inverse time delay in the operation of the protective apparatus and it is clear that in the embodiments of the present invention, as disclosed in Figs. 1 and 2, an inverse time delay is provided, such time delay varying directly as the voltage of the circuit or system to which the protective apparatus is connected.

However, in the event that an inverse time delay is not desirable, some suitable means may be used in place of the secondaries of the line voltage transformers utilized in the Figs. 1 and 2 modifications, such means being operative to provide a substantially constant-voltage tube-circuit source which is independent of the energization of the primary windings of the respective line-voltage transformers. Such constant-voltage means may be of any suitable type, as well known in the art, such, for example, as some type of critical-voltage gas-filled tube which effects a voltage-limiting arc discharge between the electrodes thereof. Obviously, however, in such a case, the supply transformer must admit of poor regulation and should, therefore, be of relatively high reactance. The application of any suitable constant-voltage means to the various modifications of the present invention should be obvious to one skilled in the art from the foregoing explanation relative to the proper application of such additional constant-voltage means.

To obviate this requirement, and where it is disadvantageous to permit of an inverse time delay in the operation of the protective apparatus, separate supply sources may be utilized for providing the necessary energization for the electronic-discharge devices.

Figure 3:
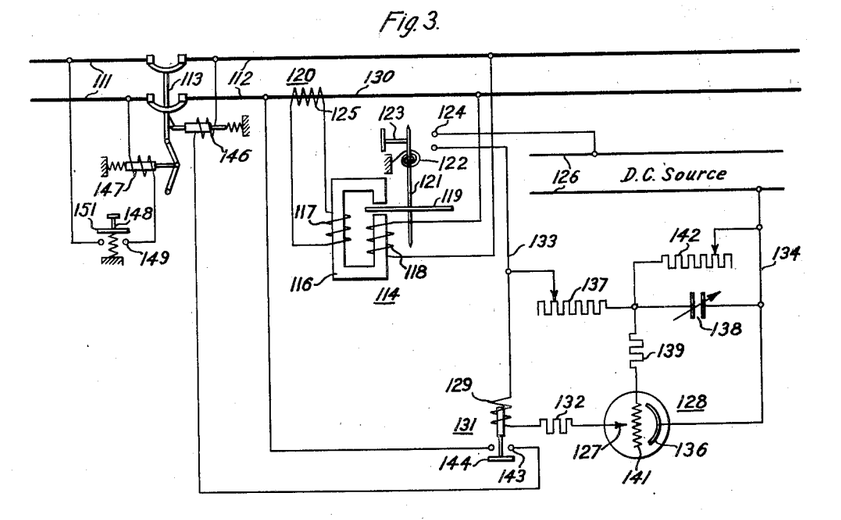
Fig. 3 illustrates an application of the invention to an electrical system and responsive to predetermined abnormal conditions of current or energy flow in the system.

Referring to Fig. 3, a supply circuit 111 is adapted to energize a load circuit 112 through a suitable circuit interrupter 113. Assuming that it is desired to effect the opening of the circuit interrupter 113 upon the occurrence of a reversal of current or energy flow in the load circuit 112, a directional relay 114 is provided and is illustrated as comprising a field member 116 conventionally illustrated as comprising a current winding 117 and a voltage winding 118, and an induction disc element 119 mounted on a spindle or shaft 121, to which is secured a restraining spring 122 and a moving contact member 123, the latter cooperating with stationary contacts 124. The current winding 117 is energized in accordance with the current traversing the load circuit 112 and is serially connected with the secondary winding 125 of a current transformer 120, the primary winding 130 thereof being indicated as one conductor of the load circuit 112. The voltage winding 118 is connected across the conductors of the load circuit 112 and is energized, therefore, in accordance with the voltage existing upon the load circuit 112. Under normal conditions of energization of the load circuit 112, the fluxes of the current winding 117 and the voltage winding 118 combine to effect a torque acting to rotate the disc 119 in a direction to maintain the moving contact 123 out of engagement with the stationary contacts 124. The restraining action of the spiral spring 122 is also in a direction to maintain the moving contact 123 out of engagement with the stationary contacts 124.

Upon a reversal of energy or current flow in the load circuit 112, the fluxes produced by the current winding 117 and the voltage winding 118 combine to effect a rotating torque acting upon the disc element 119 to effect the rotation of contacts 123 into engagement with the stationary contacts 124. For any predetermined value or duration of a reversal of energy or current flow in the load circuit 112, the stationary contacts 124 are adapted to be bridged by the moving contact 123.

A separate direct-current source 126 is provided and one of the stationary contacts 124 is connected to one conductor of the source 126. The remaining stationary contact 124 is connected to the anode-electrode 127 of an electronic discharge device 128 through the energizing winding 129 of relay 131 and a series resistor 132, by means of conductor 133. A second conductor 134 is connected to the other conductor of the direct-current source 126 and is connected to the cathode-electrode 136 of the electronic-discharge device 128.

Inasmuch as the directional-relay contacts 124 are normally open, there is no voltage impressed across the anode-electrode 127 and the cathode-electrode 136 of the electronic-discharge device 128. However, upon the actuation of the directional relay 114, the voltage of the direct-current source is impressed across the main electrodes of the tube device 128. A relatively high variable resistor 137 has one terminal thereof connected to the conductor 133 and the other terminal thereof connected to the conductor 134 through a series variable capacitor 138. A second relatively high resistor 139 has one terminal thereof connected to the common connection point of the variable resistor 137 and the variable capacitor 138 and the other terminal is connected to the grid element 141 of the electronic-discharge device 128. A very high variable resistor 142 is shunted across the variable capacitor 138 and serves the purpose of providing a discharge path for the capacitor 138.

The relay 131 is provided with stationary contacts 143 and a moving contact segment 144. The contact segment 144 is adapted to bridge the stationary contacts 143 to complete the energizing circuit for a tripping winding 146 of the circuit interrupter 113, when the relay winding 129 is energized. This trip circuit may be traced from one conductor of the load circuit 112 through stationary contacts 143, contact segment 144, trip coil 146, and thence to the other conductor of the load circuit 112. Thus, in the event of the actuation of relay 131 to bridge the stationary contacts 143 by the contact segment 144, the circuit interrupter 113 is actuated to its open position.

Any suitable circuit-interrupter-reclosing means may be provided and a possible reclosing means is indicated in the drawings as comprising a reclosing coil 147 and a normally-open push-button switch 148 having stationary contacts 149 and a moving contact segment 151. The energizing circuit for effecting the reclosure of the circuit breaker 113 may be traced from one conductor of the supply circuit 111, through the reclosing coil 147, stationary contacts 149 and contact segment 151 of the push-button switch 148, and thence to the other conductor of the supply circuit 111.

The operation of this embodiment of the present invention may be explained as follows: Assuming a current or energy-reversal condition to exist on the load circuit 112, the directional relay 114 is effectively energized to actuate the moving contact 123 into engagement with the stationary contacts 124. The voltage of the separate direct-current source 126 is, therefore, impressed across the anode-electrode 127 and the cathode-electrode 136 of the electronic-discharge device 128. The necessary grid-to-cathode voltage is provided in a substantially similar manner to the provision of the grid-to-cathode voltage as shown in the Fig. 1 modification. Briefly, the bridging of the stationary contacts 124 by the moving contact 123 completes a circuit from one conductor of the separate direct-current source 126 through the series circuit including the relatively high variable resistor 137, the variable capacitor 138, and thence to the other conductor of the separate source 126, through conductor 134. In this manner, the variable capacitor 138 is charged in accordance with the direct-current voltage of the separate source 126 and, after a predetermined time, the magnitude of such charge is of sufficient value to effect the necessary additional grid-to-cathode voltage of the tube device 128 to provide a resultant glow-discharge between the anode-electrode 127 and the cathode-electrode 136 of the tube device 128. The second relatively high resistor 139 is provided in the grid circuit, in order to limit the value of current in the grid circuit and may also be utilized to vary the magnitude of the charge required on the variable capacitor 138 before the grid-to-cathode voltage is effective, for any given anode-to-cathode voltage, to effect the glow-discharge or break-down of the tube device 128.

The rate of charge of the variable capacitor 138 is determined by the respective values of the variable resistor 137, the variable capacitor 138 and also by the magnitude of the direct-current voltage of the separate source 126. The magnitude of such charge is dependent upon the magnitude of the direct-current voltage of the source 126, the size or capacity of the variable capacitor 138, the value of the resistor 139 and the characteristics of the tube device 128. As described in reference to the modification disclosed in Fig. 1, the constants of the several energizing circuits may be so altered as to provide a definite predetermined time delay in the actuation of the circuit interrupter 113 upon the bridging of the stationary contacts 124 of the relay 114 by means of the moving contact 123.

Assuming that a sustained-current or energy-reversal condition exists in the load circuit 112, the tube device 128 is effectively energized to break down after a predetermined definite time delay and the energizing winding 129 of the relay 131 is effectively energized to bridge the stationary contacts 143 by means of the contact segment 144 to thereby effect the energization of the tripping coil 146 to effect the actuation of the circuit interrupter 113 to its open position. The resistor 132 is provided in the main-electrode circuit of the tube device 128 and the resistance thereof is so determined that the combined resistance of the energizing winding 129 and the resistor 132 is of such value to permit only a glow-discharge between the anode-electrode 127 and the cathode-electrode 136 of the tube device 128.

The high variable resistor 142 is utilized in order to provide a discharge path for the variable capacitor 138. In this manner the time delay apparatus disclosed in this modification is permitted to be effectively actuated only after a predetermined definite time delay upon the occurence of a sustained reversal of energy or current flow in the load circuit 112 or in the event of recurrent transient current or energy reversal conditions in the load circuit 112. As pointed out with reference to the Fig. 1 modification, the value of the resistor 142 may be so chosen as to permit the charge on the condenser 138 to be dissipated after a predetermined time and it is obvious that such shunt circuit permits the time delay apparatus of the present invention to include a reset feature, whereby the tube device 128 is broken down only upon the occurrence of a sustained current or energy reversal condition in the load circuit 112 or upon the recurrence of transient-reversal conditions.

The provision of the separate direct-current source 126 ensures a definite time delay in the operation of the protective apparatus of the present invention and, inasmuch as a direct-current source is provided, a rectifying means is not necessitated and the protective scheme is thereby simplified. The arrangement shown in Fig. 3 may probably be utilized in most central stations or in installations where a separate source of direct current is available and, in such event, the protective apparatus functions properly and is not affected by possible fluctuating conditions in the load circuit to which the apparatus is connected.

Figure 4:
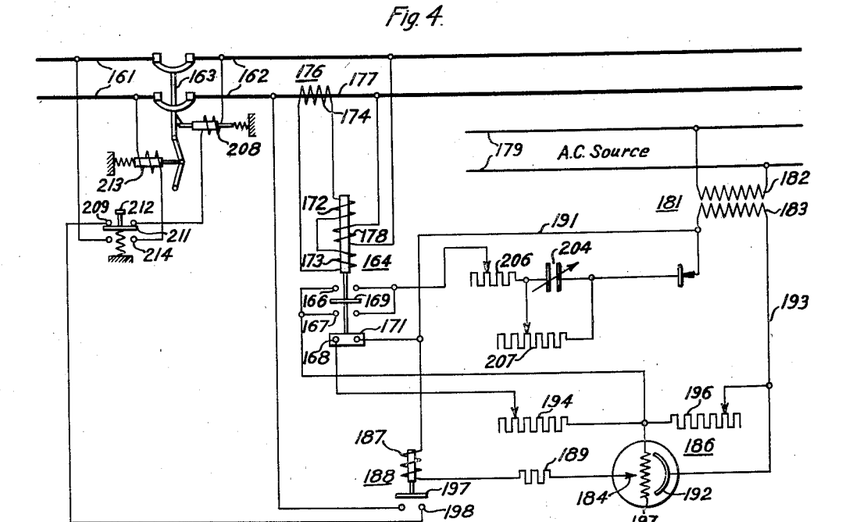
Fig. 4 shows the application of one form of the present invention responsive to predetermined abnormal conditions of power factor in an electrical system.

In the Fig. 4 modification of the present invention, a separate alternating-current source is provided and the time-delay arrangement is substantially the same as that described with reference to the Fig. 2 modification. In order to show the scope of protection or indication afforded by the combination integrating and definite-time-delay apparatus of the present invention, this modification is illustrated as being responsive to abnormal power-factor conditions existing in a load circuit or alternating-current system.

A supply circuit 161 is adapted to energize a load circuit 162 through a suitable circuit interrupter 163. A power-factor relay 164 is adapted to be energized from the load circuit 162 and is provided with a stationary contacts 166, 167 and 168 and moving contact segments 169 and 171. The power-factor relay illustrated is of the type disclosed in U. S. Patent No. 1,565,410, issued December 15, 1925, to C. A. Boddie, and assigned to the Westinghouse Electric & Manufacturing Company. Any other suitable power factor relay may be utilized and contacts may be provided to effect a circuit connection for any predetermined variation from the normal or 100% power-factor condition existing on the load circuit 162.

The power-factor relay 164 is provided with opposed-current-responsive windings 172 and 173 which are connected in series and energized from the secondary winding 174 of a current transformer 176, the primary winding 177 thereof being indicated as one conductor of the load circuit 162. The relay 164 is also provided with a voltage winding 178 and this winding is connected across the conductors of the load circuit 162. As described in the above-mentioned patent, the fluxes of the respective curre.it and voltage coils are adapted to interact to effect the actuation of the relay 164 to bridge either the contacts 166 or 167 by the contact segment 169 upon the occurrence of any predetermined abnormal power-factor condition in the load circuit 162. The stationary contacts 168 are adapted to be normally bridged by the moving contact segment 171 and such contact is only interrupted upon the actuation of the relay 164 to bridge either the stationary contacts 166 or 167 by means of the contact segment 169.

A separate alternating-current source 179 is provided for effecting the proper energization of the protective apparatus of the present invention. A voltage transformer 181 has the primary winding 182 thereof connected across the conductors of the alternating-current source 179 and a connection is completed from one terminal of the secondary winding 183 to the anode electrode 184 of an electronic-discharge device 186, through the energizing winding 187 of a relay 188 and a series-connected resistor 189 by means of conductor 191. The other secondary terminal of the voltage transformer 181 is connected to the cathode-electrode 192 of the tube device 186 by means of a conductor 193. As illustrated in the drawings, the secondary voltage of the voltage transformer 181 is impressed across the anode-electrode 184 and the cathode-electrode 192 of the tube device 186 at all times.

A relatively high variable resistor 194 has one terminal thereof connected to the conductor 191 through the normally closed contacts 168 of the power-factor relay 164, and the other terminal thereof is connected to the conductor 193 through a second substantially equal variable resistor 196. The grid element 197 of the tube device 186 is connected to the common-connection point of the variable resistor 194 and the variable resistor 196, and, in this manner, a grid-to-cathode voltage is obtained which is proportional to the voltage drop across the variable resistor 196.

Under normal conditions of power factor on the load circuit 162, the power-factor relay 164 is in the position shown and the contacts 168 are bridged by contact segment 171, thereby effecting a circuit from one terminal of the secondary winding of the voltage transformer 181 through the conductor 191, contacts 168 and contact segment 171 of relay 164, variable resistor 194, variable resistor 196, conductor 193 and thence to the other secondary terminal of the voltage transformer 181. In this manner, a voltage drop is produced in the variable resistor 196, the value of which is sufficient to effect the resultant continuous glow-discharge between the anode-electrode 184 and the cathode-electrode 192 of the tube device 186.

Since the tube device 186 is normally broken-down or is effectively energized so that a glow-discharge is effected between the anode electrode 184 and the cathode electrode 192, the energizing winding 187 of the relay 188 is normally effectively energized to maintain the moving contact segment 197 thereof out of engagement with the stationary contacts 198. In view of the continuous energization or discharge of the tube device 186, the value of the resistor 189 is so chosen that the combined resistance of the energizing winding 187 and the resistance of the resistor 189 is of such value as to limit the energization of the tube device 186 so that only a glow-discharge appears between the anode-electrode 184 and the cathode-electrode 192.

A rectifying means 199 is connected from the terminal transformer secondary conductor 191 to a series circuit including a variable capacitor 204 and a variable resistor 206. The remaining terminal of the variable resistor 206 is connected to one of the contacts 166 and one of the contacts 167 of the relay 164, and this electrical circuit is only adapted to be completed when the relay 150

164 is actuated to bridge either the contacts 166 or 167, by the contact segment 169, to effect a connection to the transformer terminal conductor 193 through the variable resistor 196. Inasmuch as the contacts 166 and 167 of relay 164 are permanently connected in parallel, it is immaterial whether the abnormal-power-factor condition existing in the load circuit 162 is leading or lagging a predetermined amount. A very high variable resistor 207 is shunted across the variable capacitor 204 and is provided for the purpose of effecting a path for permitting the dissipation of any charge on the variable capacitor 204, after a predetermined time.

Assuming an abnormal power-factor condition to exist on the load circuit 162 and also that such abnormal condition is dangerous to the connected load apparatus or to the system, or that such power-factor condition should be corrected, it will be assumed that the power-factor-responsive relay 164 is so designed and adjusted to effect the bridging of the contacts 166 by the contact segment 169 upon the occurrence of such abnormal condition. In such event, the contact segment 171 is moved out of engagement with the stationary contacts 168 at substantially the same time that the contacts 166 are bridged by the contact segment 169, the grid-to-cathode voltage of the tube device 186 being thereupon obtained by means of the circuit completed from the transformer secondary through the rectifying means 199, variable capacitor 204, variable resistor 206, contacts 166 and contact segment 169 of relay 164, variable resistor 196, conductor 193 and thence to the remaining secondary terminal of the voltage transformer 181, instead of the normal circuit from one secondary terminal of the transformer 181 through conductor 191, contacts 168 and contact segment 171 of relay 164, variable resistor 194, variable resistor 196, conductor 193 and thence to the remaining secondary terminal of the voltage transformer 181.

In accordance with the new circuit connections provided by the actuation of the power-factor-responsive relay 164, a current flows through the circuit including the variable capacitor 204, variable resistor 206, and the variable resistor 196. Such current flow provides a resulting voltage drop across the variable resistor 196 which is sufficient to effect the necessary grid-to-cathode voltage of the tube device 186 and the glow-discharge between the anode electrode 184 and cathode electrode 192 is thus maintained.

However, when the variable capacitor 204 has been charged to its maximum capacity, further current is not permitted to flow in the circuit including such capacitor and the variable resistor 196, with the result that there is no grid-to-cathode voltage impressed on the tube device 186. The glow-discharge between the anode-electrode 184 and the cathode-electrode 192 is terminated at a predetermined value of grid-voltage before said voltage becomes zero.

As pointed out with reference to the modification shown in Fig. 2, the time required for the variable capacitor 204 to receive its effective charge to prevent the flow of current therethrough, is varied in accordance with the value of the capacitor 204, the variable resistor 206, and the magnitude of the energizing voltage obtained from the secondary of the voltage transformer 181. The magnitude of such charge is also determined by the capacity of the capacitor 204, the value of the variable resistor 196, the magnitude of the supply voltage therefor, and the characteristics of the tube device 186. Since a separate alternating-current source 179 is provided for the energization of the respective circuits included in the time delay apparatus, the time delay which may be obtained, before the tube device 186 becomes ineffectively energized, may be made any predetermined value, and such time delay is, by necessity, definite.

From the foregoing explanation, it is clear that the glow-discharge of the tube device 186 is interrupted after a predetermined time delay whenever the power factor in the load circuit 162 either leads or lags by a predetermined amount, with the result that the energizing winding 187 of relay 188 is deenergized to effect the bridging of stationary contacts 198 by means of the contact segment 197. An energizing circuit is thereby completed for the trip coil 208 associated with the circuit interrupter 163. This tripping circuit may be traced from one conductor of the load circuit 162, through contacts 198 and contact segment 197 of relay 188, normally closed contacts 209 and contact segment 211 of push-button switch 212, energizing winding 208, and thence to the other conductor of the load circuit 162.

The circuit interrupter 163 is, therefore, actuated to its open position upon the deenergization of the relay 188 and the power-factor-responsive relay 164 may be so designed as to maintain the position shown in the drawings under deenergized conditions of the load circuit 162. In this manner, the protective apparatus of the present invention may be returned to its normal condition substantially instantaneously upon the reclosure of the circuit interrupter 163.

The circuit interrupter 163 is provided with a closing coil 213, one terminal of which is connected to one conductor of the supply circuit 161 and the other terminal connected to normally open contacts 214 which are adapted to be bridged by the contact segment 211 of the push-button switch 212, and the energizing circuit is completed from the contacts 214 to the other conductor of the supply circuit 161.

The large shunting variable resistor 207 is provided for the purpose of permitting the time delay apparatus of the present invention to reset itself after the occurrence of a single transient abnormal power-factor condition on the load circuit 162, and the function and operation of the combination integrating and definite-time-delay means included in this modification is substantially similar to that shown and described in reference to Fig. 2. However, since a separate alternating-current source 179 is utilized for the energizing circuits of the time-delay apparatus shown in Fig. 4, this modification of the present invention is not adversely affected by any current or voltage changes in the load circuit 162. The value of providing a separate energizing source in a time-delay scheme responsive to abnormal power-factor conditions is more obvious than the application of the present invention responsive to other abnormal system or load conditions.

Obviously, the combination integrating and definite-time-delay apparatus is applicable to any abnormal electrical conditions on a direct-current or alternating-current system and the various applications disclosed in the present application are to be considered merely as indicative of possible applications and not as limiting the scope of the application of the present invention.

It should be further understood that the various modifications of the time-delay apparatus disclosed in the several figures of the drawings are not to be limited to the exact circuit arrangement disclosed and also that any of these arrangements may be made to respond to any desired electrical or mechanical conditions existing on any electrical system or the apparatus connected thereto.

The present invention provides a novel and efficient protective system which is properly responsive to sustained abnormal conditions only after a predetermined definite time delay and the protective system also incorporates the distinctly novel feature of providing protection against recurrent transient abnormal conditions. The combination of the two modes of protection in a single protective system constitutes a distinct advancement in the protective art and the use of electronic discharge tubes for such purpose necessitates only relatively small energizing currents and effects a reduction in the number of mechanically actuated relays which are necessary.

The present invention is not to be limited unless as required by the prior art or as indicated in the appended claims.

I claim as my invention:

1. In a protective system, a distribution circuit, a circuit interrupter therefor, a condenser, a substantially constant uni-directional voltage source, a charging circuit for said condenser including a first resistor, a discharge circuit for said condenser independent of said first resistor and including a discharge resistor, means responsive to an abnormal electrical condition of said distribution circuit for energizing said charging circuit from said source during said abnormal condition and for rendering said charging circuit ineffective to charge the condenser to a predetermined degree during normal conditions and means responsive to a predetermined charge on said condenser for operating said interrupter whereby said interrupter is operated in response to a sustained abnormal condition with a definite time delay dependent upon the resistance value of said first resistor and is operated in response to transient abnormal conditions which recur within a time interval dependent upon the resistance value of said discharge resistor.

2. In a protective system, a distribution circuit, a circuit interrupter therefor, a condenser, a substantially constant uni-directional voltage source, a charging circuit for said condenser including a first resistor, a discharge circuit for said condenser independent of said first resistor and including a discharge resistor, an electric discharge device having a control element responsive to the voltage of said condenser, means responsive to an abnormal electrical condition of said distribution circuit for energizing said charging circuit from said source during said abnormal condition and for rendering said charging circuit ineffective during normal conditions, and means responsive to a discharge current of said device above a predetermined value for operating said interrupter.

3. In a protective system, a distribution circuit, a circuit interrupter therefor, a condenser, a substantially constant uni-directional voltage source, a charging circuit for said condenser including a first resistor, a discharge circuit for said condenser independent of said first resistor and including a discharge resistor, an electric discharge device having a control element responsive to the voltage of said condenser, said device being of a type in which an electric discharge may be started in response to a predetermined voltage of the control element and in which the magnitude of the discharge is independent of the voltage of the control element, means responsive to an abnormal electrical condition of said distribution circuit for energizing said charging circuit from said source during said abnormal condition and for rendering said charging circuit ineffective during normal conditions and means responsive to the discharge current of said device for operating said interrupter.

4. In a protective system, a distribution circuit, a circuit interrupter therefor, a condenser, a substantially constant uni-directional voltage source, a charging circuit for said condenser including a first resistor, a discharge circuit for said condenser independent of said charging circuit and including a discharge resistor, an electric discharge device having a control element responsive to the voltage of said condenser, said device being of a type in which an electric discharge may be started in response to a predetermined voltage of the control element and in which the magnitude of the discharge is independent of the voltage of the control element, a relay responsive to an over-current condition of said distribution circuit for connecting said charging circuit to said source during over-current conditions and for disconnecting said charging circuit during normal conditions and means responsive to the discharge current of said device for operating said interrupter.

5. In a protective system, an alternating-current circuit, a circuit interrupter therefor, a condenser, a substantially constant uni-directional voltage source, a charging circuit for said condenser including a first resistor, a discharge circuit for said condenser independent of said first resistor and including a discharge resistor, an electric discharge device having a control element responsive to the voltage of said condenser, said device being of a type in which an electric discharge may be started in response to a predetermined voltage of the control element and in which the magnitude of the discharge is independent of the voltage of the control element, a relay responsive to an abnormal voltage and current condition of said alternating-current circuit for connecting said charging circuit to said source during said abnormal condition and for disconnecting said charging circuit during normal conditions and means responsive to the discharge current of said device for operating said interrupter.

6. In a protective system, a distribution circuit, a circuit interrupter therefor, an electric discharge device having a control element, means including said control element for maintaining a discharge current through said device during normal conditions of said distribution circuit, means responsive to an abnormal electrical condition of said distribution circuit for modifying an electrical condition of said control element to cause reduction of said discharge current, and means responsive to a predetermined reduction of said discharge current for operating said interrupter.

7. In a protective system, a distribution circuit, a circuit interrupter therefor, a condenser, an electric discharge device having a control element responsive to the voltage of said condenser, means including said control element for maintaining a discharge current through said device during normal conditions of said distribution circuit, means responsive to an abnormal electrical condition of said distribution circuit for varying the charge upon said condenser to cause delayed reduction of said current, and means responsive to a predetermined reduction of said discharge current for operating said interrupter.

8. In a protective system, a distribution circuit, a circuit interrupter therefor, a condenser, an electric discharge device having principal electrodes and having a control element responsive to the voltage of said condenser, said discharge device being of a type in which a discharge current may be initiated in response to a predetermined voltage condition of said control element and interrupted in response to a reversal of voltage of said principal electrodes, means for applying an alternating voltage to said principal electrodes, means including said control element for maintaining a pulsating discharge current through said device during normal conditions of said distribution circuit, means responsive to an abnormal electrical condition of said distribution circuit for varying the charge upon said condenser to cause delayed interruption of said discharge current, and means responsive to interruption of said discharge current for operating said interrupter.

9. In a protective system, a distribution circuit, a circuit interrupter therefor, a condenser, a glow discharge device having principal electrodes and having a control element responsive to the voltage of said condenser, means for applying an alternating voltage to said principal electrodes, means including said control element for maintaining a pulsating discharge current through said device during normal conditions of said distribution circuit, means responsive to an abnormal electrical condition of said distribution circuit for varying the charge upon said condenser to cause delayed interruption of said discharge current and means responsive to interruption of said discharge current for operating said interrupter.

10. In a protective system, a distribution circuit, a circuit interrupter therefor, a condenser, an electric discharge device having a control element responsive to the voltage of said condenser, means including said control element for maintaining a discharge current through said device during normal conditions of said distribution circuit, a charging circuit including a resistor for applying a direct current charge to said condenser to reduce said discharge current, a relay responsive to an electrical condition of said distribution circuit for rendering said charging circuit ineffective during normal conditions and effective during an abnormal condition of said distribution circuit, and means responsive to a predetermined reduction of said discharge current for operating said interrupter.

11. In a protective system, a distribution circuit, a circuit interrupter therefor, a condenser, a glow discharge device having principal electrodes and having a control element responsive to the voltage of said condenser, means for applying an alternating voltage to said principal electrodes, means including said control element for maintaining a discharge current through said device during normal conditions of said distribution circuit, a charging circuit including a resistor for applying a direct current charge to said condenser to interrupt said discharge current, a relay responsive to an electrical condition of said distribution circuit for rendering said charging circuit ineffective during normal conditions and effective during an abnormal condition of said distribution circuit, and means responsive to interruption of said discharge current for operating said interrupter.

12. In a protective system, a distribution circuit, a circuit interrupter therefor, a condenser, a glow discharge device having principal electrodes and having a control element responsive to the voltage of said condenser, means for applying an alternating voltage to said principal electrodes, means including said control element for maintaining a discharge current through said device during normal conditions of said distribution circuit, a charging circuit including a resistor for applying a direct current charge to said condenser to interrupt said discharge current, a relay responsive to an under-voltage condition of said distribution circuit for rendering said charging circuit ineffective during normal conditions and effective during an under-voltage condition of said distribution circuit, and means responsive to interruption of said discharge current for operating said interrupter.

WILLIAM A. MINKLER.